United States Patent
Kubo et al.

(10) Patent No.: US 11,796,518 B2
(45) Date of Patent: Oct. 24, 2023

(54) APPARATUS AND METHOD FOR PROCESSING MASS SPECTRUM

(71) Applicant: JEOL Ltd., Tokyo (JP)

(72) Inventors: Ayumi Kubo, Tokyo (JP); Masaaki Ubukata, Tokyo (JP)

(73) Assignee: JEOL Ltd., Tokyo (JP)

( * ) Notice: Subject to any disclaimer, the term of this patent is extended or adjusted under 35 U.S.C. 154(b) by 23 days.

(21) Appl. No.: 17/472,791

(22) Filed: Sep. 13, 2021

(65) Prior Publication Data
US 2022/0082537 A1    Mar. 17, 2022

(30) Foreign Application Priority Data
Sep. 17, 2020    (JP) .................... 2020-155941

(51) Int. Cl.
*G01N 30/72* (2006.01)
*G01N 30/86* (2006.01)
*H01J 49/00* (2006.01)
*G01N 30/02* (2006.01)
*H01J 49/40* (2006.01)

(52) U.S. Cl.
CPC ..... *G01N 30/7206* (2013.01); *G01N 30/8631* (2013.01); *H01J 49/0036* (2013.01); *G01N 2030/025* (2013.01); *H01J 49/40* (2013.01)

(58) Field of Classification Search
None
See application file for complete search history.

(56) References Cited

U.S. PATENT DOCUMENTS

| | | | | |
|---|---|---|---|---|
| 5,175,430 A | * | 12/1992 | Enke | G01N 30/8679 |
| | | | | 250/288 |
| 2010/0158385 A1 | * | 6/2010 | Jeung | G01N 23/087 |
| | | | | 382/191 |
| 2013/0228677 A1 | * | 9/2013 | Kawaguchi | H01J 49/0031 |
| | | | | 250/281 |

(Continued)

FOREIGN PATENT DOCUMENTS

JP    201133346 A    2/2011

OTHER PUBLICATIONS

Hope et al., "Evaluation of the DotMap algorithm for locating analytes of interest based on mass spectral similarity . . . ," Jun. 27, 2005, downloaded from https://www.sciencedirect.com/science/article/pii/S0021967305011854?via%3Dihub on Nov. 22, 2022 (Year: 2005).*

(Continued)

*Primary Examiner* — Michael J Dalbo
*Assistant Examiner* — Denise R Karavias
(74) *Attorney, Agent, or Firm* — THE WEBB LAW FIRM

(57) ABSTRACT

An evaluation section identifies, in a list of candidate compounds, a group of candidate compounds having the degree of reverse similarity greater than or equal to a threshold s1. When all candidates in the group of candidate compounds have differences between the degrees of similarity that are greater than or equal to a threshold s2, the evaluation section judges that there is a composite state. The difference between the degrees of similarity is computed by subtracting the degree of forward similarity from the degree of reverse similarity. The similarity ratio may be used in place of the difference between the degrees of similarity.

9 Claims, 20 Drawing Sheets

(56) References Cited

U.S. PATENT DOCUMENTS

2017/0131248 A1* 5/2017 Kageyama ............ H01J 49/004

OTHER PUBLICATIONS

Harvey, DePauw University, "General Theory of Column Chromatography", Jun. 15, 2022, downloaded https://chem.libretexts.org/Courses/BethuneCookman_University/B-CU%3A_CH-345_Quantitative_Analysis/Book%3A_Analytical_Chemistry_2.1_(Harvey)/12%3A_Chromatographic_and_Electrophoretic_Methods/12.02%3 on Nov. 24, 2022 (Year: 2020).*

Extended European Search Report issued in EP21197171.8 dated Feb. 2, 2022.

Hope et al.; Evaluation of the DotMap algorithm for locating analytes of interest based on mass spectral similarity in data collected using comprehensive two-dimensional gas chromatography coupled with time-of-flight mass spectrometry; Journal of Chromatography A; 2005; vol. 1086, pp. 185-192.

Sinha et al.; Algorithm for locating analytes of interest based on mass spectral similarity in GC x GC-TOF-MS data: analysis of metabolites in human infant urine; Journal of Chromatography A; 2004; vol. 1058; pp. 209-215.

* cited by examiner

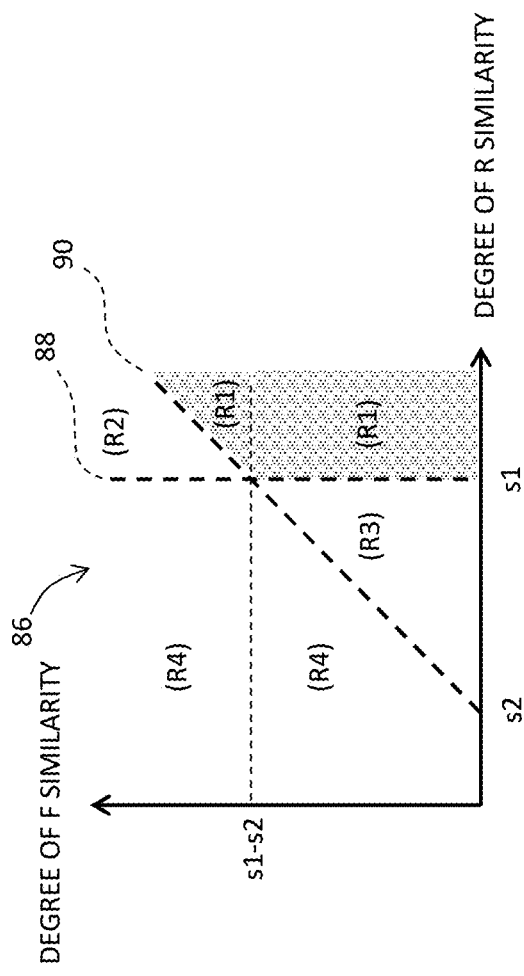

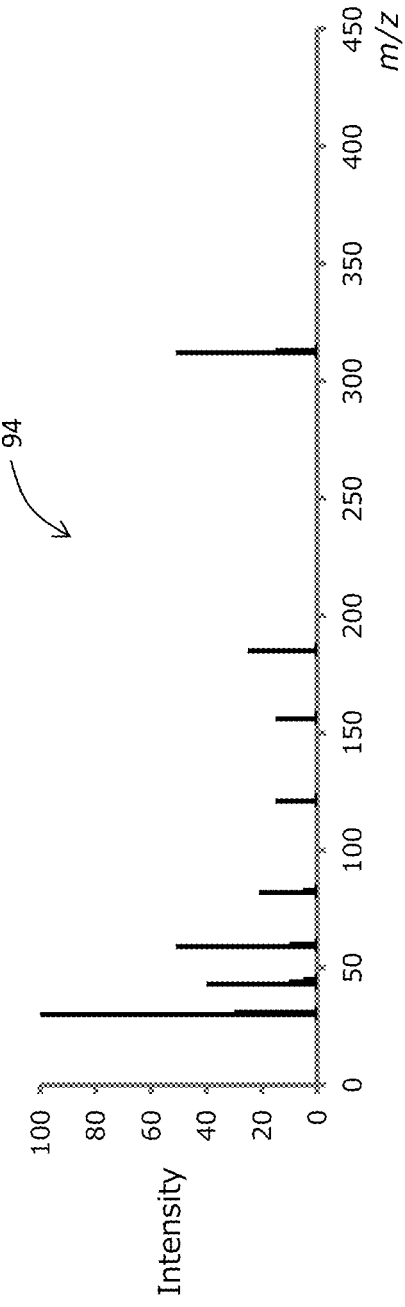
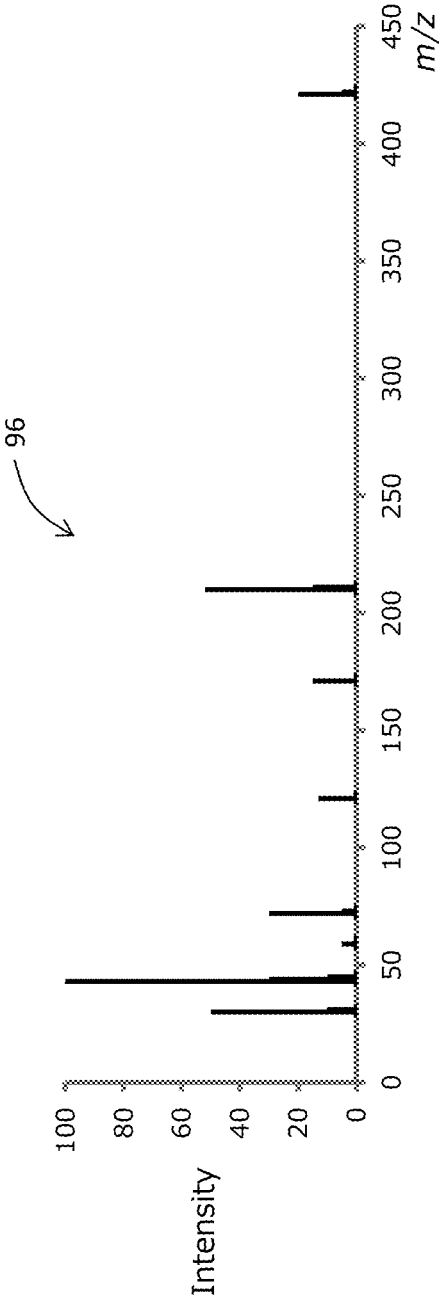

FIG. 13

| CANDIDATE | FORWARD SIMILARITY | REVERSE SIMILARITY | DIFFERENCE BETWEEN DEGREES OF SIMILARITY |
|---|---|---|---|
| Library-XX | 650 | 920 | 270 |
| Library-YY | 500 | 850 | 350 |
| Library-ZZ | 600 | 652 | 2 |
| ... | ... | ... | ... |
| ... | ... | ... | ... |

FIG. 14

| CANDIDATE | FORWARD SIMILARITY | REVERSE SIMILARITY | DIFFERENCE BETWEEN DEGREES OF SIMILARITY |
|---|---|---|---|
| Library-XX | 750 | 920 | 170 |
| Library-YY | 842 | 850 | 2 |
| Library-ZZ | 700 | 821 | 121 |
| ... | ... | ... | ... |

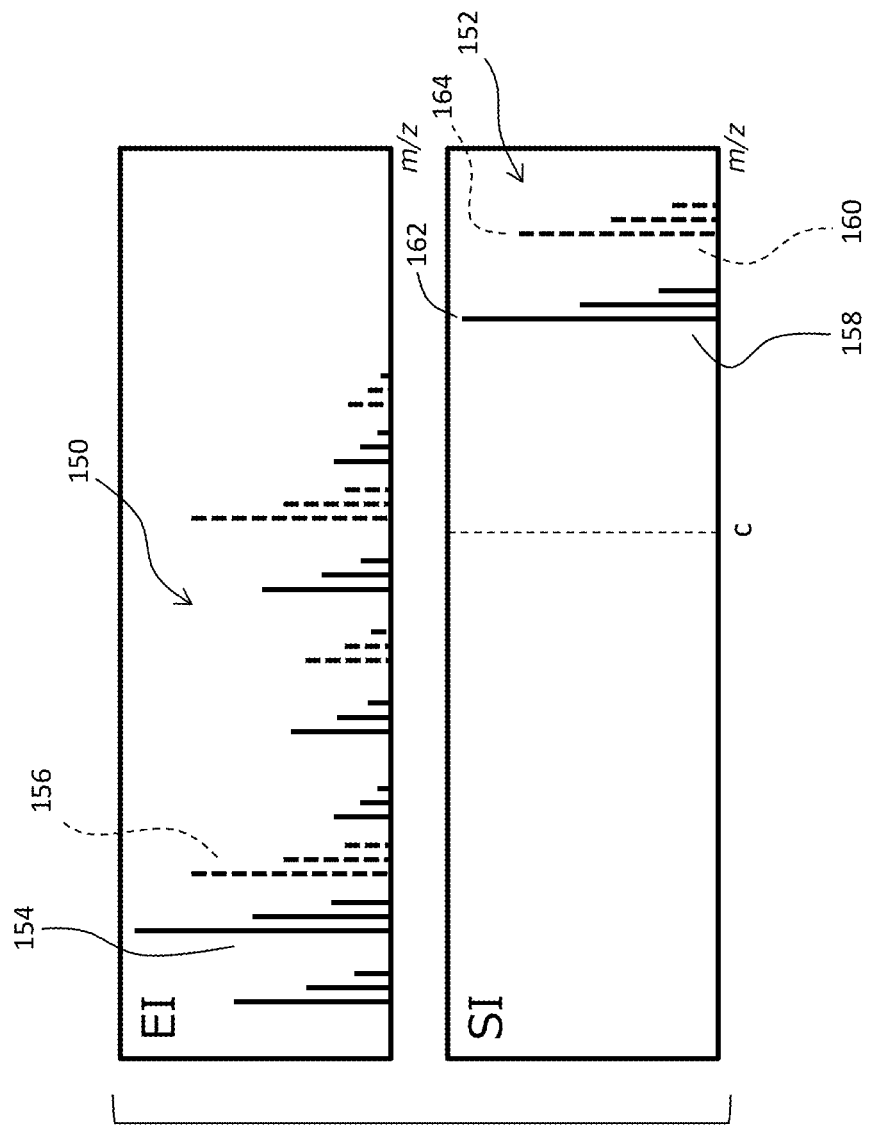

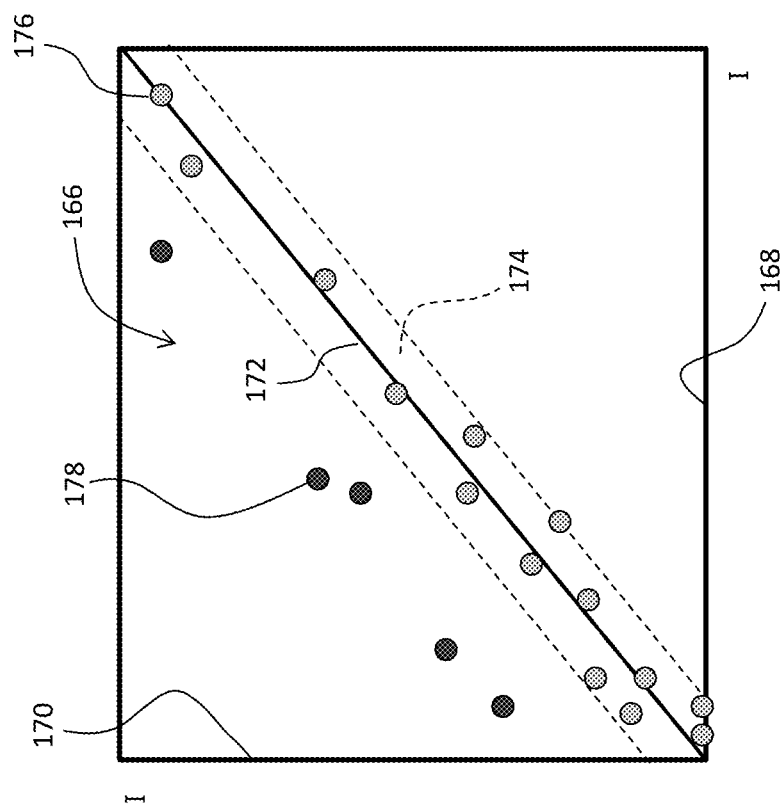

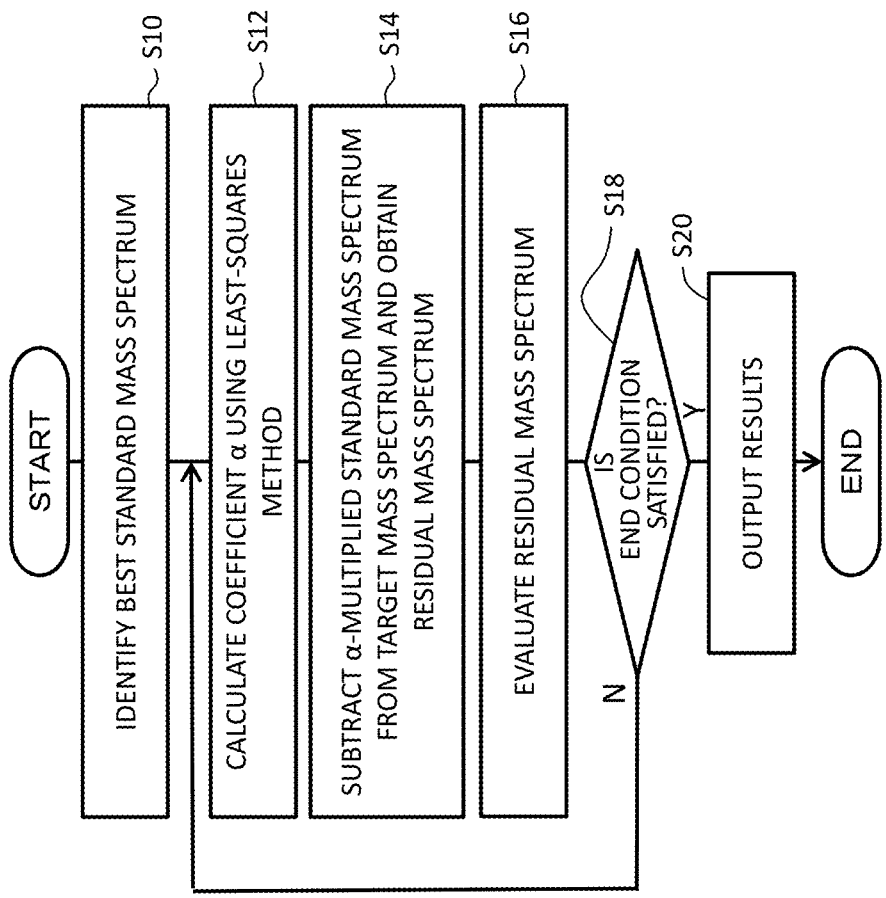

APPARATUS AND METHOD FOR PROCESSING MASS SPECTRUM

CROSS REFERENCE TO RELATED APPLICATION

This application claims priority to Japanese Patent Application No. 2020-155941 filed Sep. 17, 2020, the disclosure of which is hereby incorporated by reference in its entirety.

BACKGROUND OF THE INVENTION

Field of the Invention

The present disclosure relates to an apparatus and a method for processing a mass spectrum, and in particular to evaluating a mass spectrum by comparing it with a group of standard mass spectra in a library.

Description of Related Art

A mass spectrometry system is composed of, for example, a gas chromatograph, a mass spectrometry apparatus, and a mass spectrum processing apparatus. In the gas chromatograph, a plurality of components are temporally separated from a sample and sequentially carried to the mass spectrometry apparatus. The mass spectrometry apparatus performs mass spectrometry repeatedly on the plurality of components carried therein. The mass spectrum processing apparatus sequentially generates mass spectra based on signals indicating the mass spectrometry results. The mass spectra constitute a mass spectrum array.

The mass spectrum processing apparatus has a function of identifying a chemical compound per component generated from the sample. Before identifying the compound, first, a total ion current chromatogram (TICC) is generated from the mass spectrum array, and then, a plurality of peaks included in the TICC are detected. For each detected peak, a mass spectrum corresponding to the detected peak is selected or generated. The mass spectrum is then compared with a group of standard mass spectra in a library, thereby generating a list of candidate compounds. Hereinafter, the mass spectrum to be compared with the group of standard mass spectra will be referred to as a target mass spectrum.

At the time of detecting peaks in the TICC, generally, the time width corresponding to an expected peak width is set. For example, when deconvolution is applied to the TICC, a plurality of peaks overlapped in the TICC are separated according to the time width. When the target mass spectrum is formed as an integrated mass spectrum, its integration period is also a kind of time width.

When the time width described above is too large, the target mass spectrum to be searched tends to be a composite mass spectrum (a combination of a plurality of compound mass spectra). That is, the target mass spectrum tends to be in a composite state. The composite state can also be referred to as a coelution state where a plurality of compounds extracted in close proximity to one another in terms of time are observed as a single compound in appearance. When the time width is too small, excessive peak detection tends to occur.

A timing at which components of the sample are carried out from the gas chromatograph depends on various conditions (for example, type and length of a column). Setting time parameters for peak detection appropriately is not always easy for the user. Even when such parameter setting is not required, there is still a need for appropriate evaluation of the nature of the target mass spectrum.

A mass spectrometry system disclosed in JP 2011-33346 A performs a correction step of correcting a mass spectrum and a comparison step of comparing the corrected mass spectrum with a group of standard mass spectra in a library. In the correction step, contaminated components (contaminated peaks) are removed from the mass spectrum. The subsequent comparison step computes four types of degrees of similarity, including the degree of similarity generated in a reverse search (degree of reverse similarity) and the degree of similarity generated in a forward search (degree of forward similarity). Those degrees of similarity are computed after the mass spectrum is corrected and are thus not for identifying the presence of contaminated components. This means that the degrees of similarity are not for evaluating the nature of the mass spectrum.

SUMMARY OF THE INVENTION

An object of the present disclosure is to achieve a technique that can judge that a target mass spectrum is a composite mass spectrum. Alternatively, an object of the present disclosure is to provide information that can be referred to in evaluating the nature of the target mass spectrum. Alternatively, an object of the present disclosure is to allow the user to recognize that a peak included in a chromatogram is a peak derived from a plurality of compounds.

A mass spectrum processing apparatus according to the present disclosure has first degree of similarity computing means for computing a first degree of similarity between a first representative value array that represents a target mass spectrum obtained by mass spectrometry of a sample and a first corresponding value array that is selected from a standard mass spectrum in a library according to a corresponding relationship with the first representative value array, second degree of similarity computing means for computing a second degree of similarity between a second representative value array that represents the standard mass spectrum and a second corresponding value array that is selected from the target mass spectrum according to a corresponding relationship with the second representative value array, and evaluating means for judging, based on the first degree of similarity and the second degree of similarity, that the target mass spectrum is in a composite state in which the target mass spectrum is derived from a plurality of compounds.

A mass spectrum processing method according to the present disclosure including the steps of computing a first degree of similarity between a first representative value array that represents a target mass spectrum obtained by mass spectrometry of a sample and a first corresponding value array that is selected from a standard mass spectrum in a library according to a corresponding relationship with the first representative value array, computing a second degree of similarity between a second representative value array that represents the standard mass spectrum and a second corresponding value array that is selected from the target mass spectrum according to a corresponding relationship with the second representative value array, and judging that the target mass spectrum is a composite mass spectrum derived from a plurality of compounds, or providing information indicating the possibility that the target mass spectrum is the composite mass spectrum, based on the first degree of similarity and the second degree of similarity.

A program according to the present disclosure has a function of computing a first degree of similarity between a first representative value array that represents a target mass spectrum obtained by mass spectrometry of a sample and a first corresponding value array that is selected from a standard mass spectrum in a library according to a corresponding relationship with the first representative value array, a function of computing a second degree of similarity between a second representative value array that represents the standard mass spectrum and a second corresponding value array that is selected from the target mass spectrum according to a corresponding relationship with the second representative value array, and a function of judging that the target mass spectrum is a composite mass spectrum derived from a plurality of compounds, or providing information indicating the possibility that the target mass spectrum is the composite mass spectrum, based on the first degree of similarity and the second degree of similarity.

BRIEF DESCRIPTION OF DRAWINGS

Embodiments of the present disclosure will be described based on the following figures, wherein:

FIG. 7 is a diagram illustrating judgment conditions according to the first example;

FIG. 8 is a diagram illustrating a mass spectrum of a first compound;

FIG. 9 is a diagram illustrating a mass spectrum of a second compound;

FIG. 13 is a diagram illustrating first search results;

FIG. 14 is a diagram illustrating second search results;

FIG. 20 is a diagram for explaining a second variation;

FIG. 21 is a diagram for explaining a third variation; and

FIG. 22 is a diagram for explaining a fourth variation.

DESCRIPTION OF THE INVENTION

Figure 1:
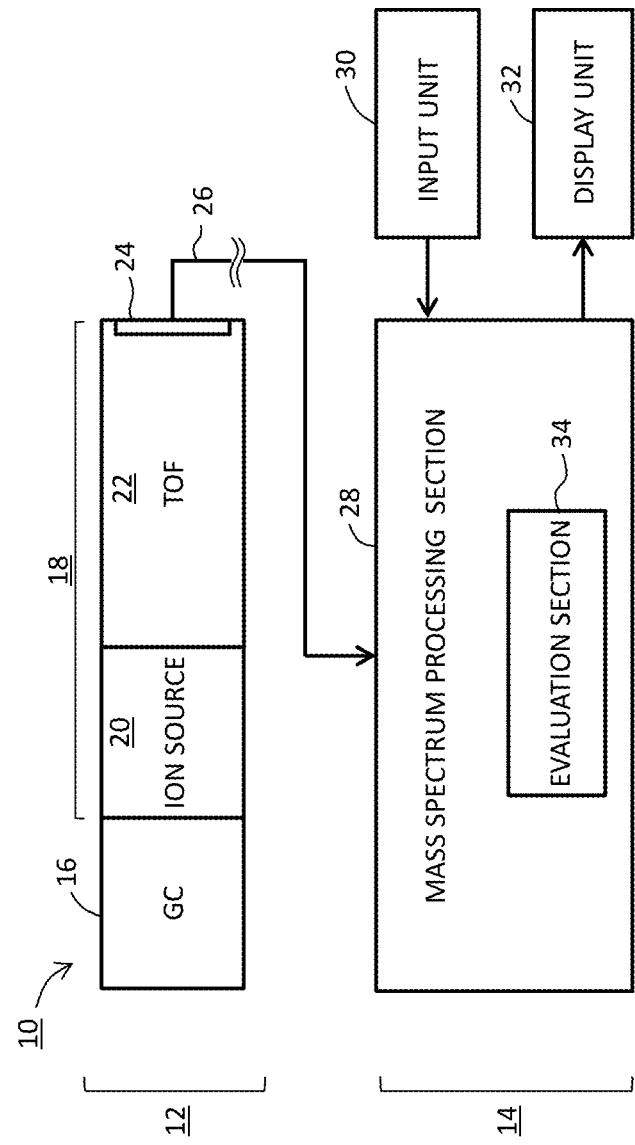
FIG. 1 is a block diagram illustrating a mass spectrometry system according to an embodiment.

Hereinafter, embodiments will be described with reference to the drawings.

(1) Summary of Embodiments

A mass spectrum processing apparatus according to an embodiment has first degree of similarity computing means, second degree of similarity computing means, and evaluating means. The first degree of similarity computing means computes a first degree of similarity between a first representative value array that represents a target mass spectrum obtained by mass spectrometry of a sample and a first corresponding value array that is selected from a standard mass spectrum in a library according to a corresponding relationship with the first representative value array. The second degree of similarity computing means computes a second degree of similarity between a second representative value array that represents the standard mass spectrum and a second corresponding value array that is selected from the target mass spectrum according to a corresponding relationship with the second representative value array. The evaluating means judges, based on the first degree of similarity and the second degree of similarity, that the target mass spectrum is in a composite state in which the target mass spectrum is derived from a plurality of compounds. The first degree of similarity computing means corresponds to a first calculator or a first computation unit. The concept of the first degree of similarity computing means encompasses a degree of forward similarity computation unit described below. The second degree of similarity computing means corresponds to a second calculator or a second computation unit. The concept of the second degree of similarity computing means encompasses a degree of reverse similarity computation unit described below.

If the target mass spectrum is derived from only a compound associated with the standard mass spectrum, the first degree of similarity is high. If not so, the first degree of similarity is low. The first degree of similarity is an index indicating the possibility of the target mass spectrum being derived from a single compound (in other words, the purity). On the other hand, if the target mass spectrum includes the standard mass spectrum; that is, if components associated with the target mass spectrum include a compound associated with the standard mass spectrum, the second degree of similarity is high. If not so, the second degree of similarity is low. The second degree of similarity is an index indicating the possibility of containing compounds. The above configuration serves to evaluate the relationship between the target mass spectrum and the standard mass spectrum; in other words, the nature of the target mass spectrum, by using the characteristics of both of the first degree of similarity and the second degree of similarity. When a judgment that the target spectrum is in the composite state is obtained, the conditions for generating the target spectrum may be changed to regenerate target spectra, or the composite state may be reported to the user.

The composite state is a state where a plurality of mass spectra generated from a plurality of compounds overlap each other. This typically occurs when peak separation in a chromatogram is insufficient. This state may also be referred to as a state of coelution. At the time of judging the composite state, other information may also be referred to, along with the first degree of similarity and the second degree of similarity.

In the embodiment, the evaluating means judges that the target mass spectrum is in the composite state when a combination of the first degree of similarity and the second degree of similarity belongs to a judgment region located in a space defined by a first degree of similarity axis and a second degree of similarity axis. The judgment region may be defined based on information obtained from the first degree of similarity and the second degree of similarity (for example, a difference between the degrees of similarity). The judgment region may be defined by setting thresholds or judgment segments separately for the first degree of similarity and the second degree of similarity. The evaluating means corresponds to an evaluator or an evaluation unit. The concept of the evaluating means encompasses an evaluation section described below.

In the embodiment, the evaluating means includes a difference computation unit that computes a difference between the first degree of similarity and the second degree of similarity as a difference between the degrees of similarity and a judgment unit that judges that the target mass spectrum is in the composite state based on the difference between the degrees of similarity. So long as certain preconditions are met, the difference between the degrees of similarity is an index indicating the degree of the composite state. The difference computation unit corresponds to a third calculator or a third computation unit. The concept of the judgment unit encompasses a composite state judgment unit described below.

The mass spectrum processing apparatus according to the embodiment further has searching means. The searching means performs a library search based on the target mass spectrum and generates a list of candidate compounds. The difference computation unit computes a difference between the degrees of similarity by subtracting the first degree of similarity from the second degree of similarity. The judgment unit identifies, from a list of candidate compounds, a group of candidate compounds having the second degree of similarity greater than or equal to a threshold s1, and judges that the target mass spectrum is in the composite state when all candidates in the group of candidate compounds have a difference between the degrees of similarity that is greater than or equal to a threshold s2. The searching means corresponds to a searcher or a search unit. The concept of the searching means encompasses a search section described below.

When the calculated second degree of similarity is relatively high, and when the target mass spectrum includes a mass spectrum other than the standard mass spectrum, the difference between the degrees of similarity is large. In contrast, when the target mass spectrum includes the standard mass spectrum only, the difference between the degrees of similarity is small. The difference between the degrees of similarity may thus be regarded as an index indicating impurities (degree of contamination). Judgment based on the second degree of similarity and the difference between the degrees of similarity can enhance the accuracy of composite state judgment.

The mass spectrum processing apparatus according to the embodiment has chromatogram generating means, means for generating or selecting the target mass spectrum, and condition changing means. The chromatogram generating means generates a chromatogram based on a mass spectrum array obtained by repeating mass spectrometry on a plurality of components temporally separated from a sample. The means for generating or selecting the target mass spectrum generates or selects, as the target mass spectrum, a mass spectrum corresponding to a peak included in the chromatogram from the mass spectrum array. The condition changing means changes the conditions for peak detection performed on the chromatogram when a judgment that the target mass spectrum is in the composite state is obtained.

In the embodiment, the condition changing means reduces the time width that is the condition for peak detection when the judgment that the target mass spectrum is in the composite state is obtained. After the time width is changed, peak detection is performed again on the chromatogram. For example, when the number of times the target mass spectra are judged to be in the composite state is greater than or equal to a certain value for the entire chromatogram, the time width is reduced. The time width may be reduced in a stepwise manner until the number of times the target mass spectra are judged to be in the composite state becomes smaller than or equal to the certain value. It is also possible to adopt a variation where parameters other than the time width (such as, for example, a threshold to be compared with the height of a peak) are changed.

The mass spectrum processing apparatus according to the embodiment has chromatogram generating means and display processing means. The chromatogram generating means generates a chromatogram having a retention time axis based on a mass spectrum array obtained by repeating mass spectrometry on a plurality of components temporally separated from the sample. The display processing means displays a display element indicating a period or a segment in which the judgment that the target mass spectrum is in the composite state is obtained, along with the chromatogram. This configuration enables an analyst or an experimenter to recognize a timing at which the composite state (in other words, a coelution state) is generated when referring to the chromatogram.

In the embodiment, the first degree of similarity is the degree of forward similarity that has the characteristic of being lower as the likelihood that the target mass spectrum is a composite mass spectrum derived from a plurality of compounds is higher. The second degree of similarity is the degree of reverse similarity that has the characteristic of being higher as the likelihood that the target mass spectrum includes the standard mass spectrum is higher.

In general, a system for performing a library search has a function of calculating the degree of forward similarity and a function of calculating the degree of reverse similarity. The system performs weighted addition on the two degrees of similarity to thereby obtain the final degree of similarity. The above configuration can utilize such existing functions to judge the composite state.

In the embodiment, the first representative value array is composed of a plurality of numerical values that are greater than or equal to a threshold p1 among all numerical values constituting the target mass spectrum. The second representative value array is composed of a plurality of numerical values that are greater than or equal to a threshold p2 among all numerical values constituting the standard mass spectrum. When background noise is already removed from the target spectrum, the threshold p1 may be the smallest value greater than 0. The first threshold may be set to a higher value in order to reduce the amount of computation. The threshold p2 is generally the smallest value greater than 0, but may be set to a higher value.

Individual elements constituting the representative value array and the corresponding value array are numerical values indicating the degrees of intensity. When alignment between the target mass spectrum and the standard mass spectrum in the m/z axis direction is completed, a plurality of m/z of a plurality of representative values constituting the representative value array and a plurality of m/z of a plurality of corresponding values constituting the corresponding value array are basically identical, and the corresponding relationship described above indicates this relationship.

A mass spectrum processing method according to an embodiment has a first degree of similarity computing step, a second degree of similarity computing step, and an evaluating step. The first degree of similarity computing step computes the first degree of similarity between a first representative value array that represents a target mass spectrum obtained by mass spectrometry of a sample and a first corresponding value array that is selected from a standard mass spectrum in a library according to a corresponding relationship with the first representative value array. The second degree of similarity computing step computes the second degree of similarity between a second representative value array that represents the standard mass spectrum and a second corresponding value array that is selected from the target mass spectrum according to a corresponding relationship with the second representative value array. The evaluating step judges that the target mass spectrum is a composite mass spectrum derived from a plurality of compounds, or provides information indicating the possibility that the target mass spectrum is the composite mass spectrum, based on the first degree of similarity and the second degree of similarity. The difference between the degrees of similarity described above or an index computed from the second degree of similarity and the difference between the degrees of similarity may be provided as the information indicating the possibility that the target mass spectrum is the composite mass spectrum.

Although, in the embodiment, the above plurality of steps are performed automatically, part of the configuration or part of some steps may be performed by the user. The above mass spectrum processing method can be implemented by hardware or software functions. In the case of the latter, a program for executing the above mass spectrum processing method is installed in an information processing device via a portable storage medium or a network. The concept of the information processing device encompasses a computer, a mass spectrum processing apparatus, a mass spectrometry apparatus, a mass spectrometry system, and the like.

(2) Details of Embodiments

FIG. 1 illustrates a mass spectrometry system 10. The mass spectrometry system 10 includes a mass spectrum processing apparatus according to an embodiment. The mass spectrometry system 10 is a system for carrying out qualitative analysis and quantitative analysis on a plurality of compounds included in a sample.

In FIG. 1, the mass spectrometry system 10 is composed of a measuring device 12 and an information processing device 14. The measuring device 12 is composed of a gas chromatograph (GC) 16 and a mass spectrometer 18. The information processing device 14 is composed of a computer or the like and functions as a mass spectrum processing apparatus. The mass spectrometry system 10 is the so-called gas chromatograph mass spectrometer (GC-MS). Other pre-processing sections may also be provided before the mass spectrometer 18.

The GC 16 has a column for temporally separating a plurality of components included in a sample. That is, the column extracts the plurality of components from the sample. The plurality of components that are separated are sequentially carried to an ion source 20 in the mass spectrometer 18.

The mass spectrometer 18 is composed of the ion source 20, a time-of-flight mass spectrometer 22, and a detector 24. The ion source 20 illustrated in FIG. 1 is an ion source employing electron ionization (EI method). When such an ion source is used, generally, a number of fragment ions are observed, and molecular ions tend not to be observed. A library is provided to identify compounds from a mass spectrum obtained by the EI method. In other words, there is provided a database having a group of mass spectra corresponding to a group of known compounds. It is thus possible to identify the compounds by performing a library search based on the measured mass spectrum.

The time-of-flight mass spectrometer 22 measures the time-of-flight that each ion output from the ion source 20 takes to travel. Other mass spectrometers such as, for example, a quadrupole mass spectrometer may be used in place of the time-of-flight mass spectrometer 22. The detector 24 detects individual ions. A detection signal 26 output from the detector 24 is transmitted to a signal processing circuit (not shown). The detection signal 26 is generated every time an ion pulse is output from the ion source 20. The detection signal 26 is a signal indicating the number of ions for each time-of-flight; that is, a signal indicating the number of ions distributed along the time-of-flight axis.

The information processing device 14 will now be described. The information processing device 14 has a mass spectrum processing section 28. The mass spectrum processing section 28 is embodied as a processor (for example, a CPU) that executes a program. The mass spectrum processing device 28 is connected to an input unit 30 and a display unit 32. In the embodiment, the mass spectrum processing section 28 has an evaluation section 34. The evaluation section 34 has a function of judging that a target mass spectrum for which the library search has been performed is a composite mass spectrum derived from a plurality of compounds; that is, a function of judging that the target mass spectrum is in a composite state.

Figure 2:
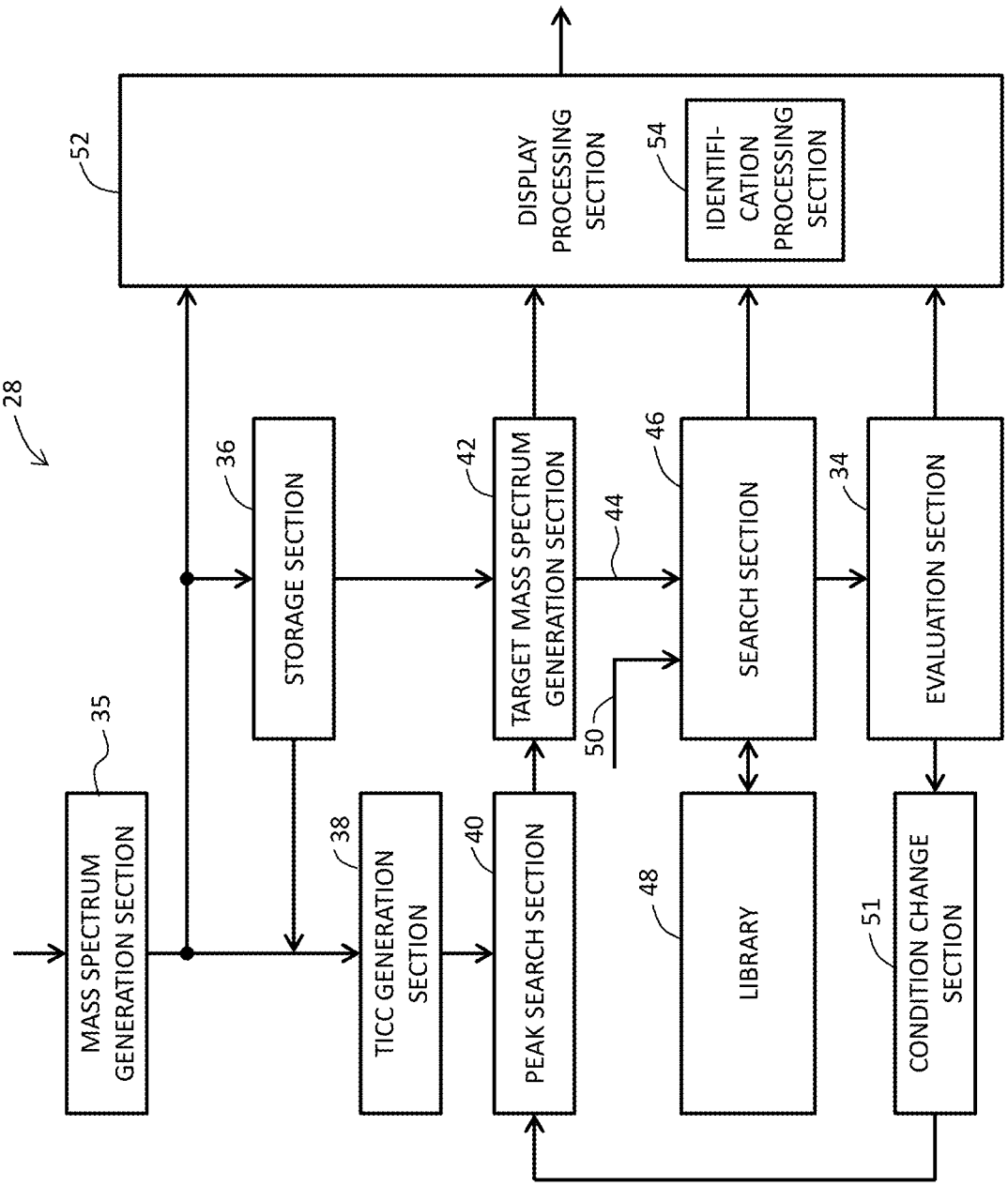
FIG. 2 is a block diagram illustrating an example configuration of a mass spectrum processing section in FIG. 1.

FIG. 2 shows an example configuration of the mass spectrum processing section 28. A plurality of blocks shown in FIG. 2 correspond to a plurality of functions provided by the processor, with some exceptions. A mass spectrum generation section 35 generates mass spectra based on detection signals sequentially output from the mass spectrometer. The mass spectrum generation section 35 thus generates a mass spectrum array which is composed of a plurality of mass spectra aligned along the retention time axis. Data representing the mass spectrum array are transmitted to a total ion current chromatogram (TICC) generation section 38. The data are also transmitted to a storage section 36 and stored therein. To display the mass spectrum on the display unit, the data representing the mass spectrum to be displayed are transmitted from the mass spectrum generation section 35 or the storage section 36 to a display processing section 52.

The TICC generation section 38 generates a TICC from the mass spectrum array. Specifically, it integrates distributed intensity values constituting a mass spectrum obtained for each retention time, thereby calculating a total ion current (TIC). It then plots a plurality of TICs along the retention time axis, thereby generating a TICC.

A peak search section 40 searches a plurality of peaks included in the TICC. At this time, a variety of peak detection techniques, such as, for example, deconvolution may be used. Deconvolution can separate a seemingly single peak in the TICC into a plurality of peaks. The mass spectrum array is referred to when deconvolution is performed.

In the embodiment, at the time of peak detection, an expected peak width is set as the time width. When a larger time width is set, a plurality of peaks tend to be detected as a single peak. In contrast, when a smaller time width is set, an excessive number of peaks tend to be detected. It is thus not always easy for the user to set the time width appropriately. In this regard, according to the embodiment, the time width can be set appropriately in an automatic or manual manner based on a composite state judgment. In the embodiment, a relatively larger value (for example, 10 seconds) is set as an initial value for the time width. The composite state judgment according to the embodiment can also be utilized in using the variety of peak detection techniques where time conditions are generally required to be set.

When the plurality of peaks included in the TICC are identified by the peak search section 40, a target mass spectrum generation section 42 generates a target mass spectrum for each peak. It is also possible to generate, as a target spectrum, an integrated mass spectrum corresponding the peaks, based on the mass spectrum array stored in the storage section 36. Alternatively, it is also possible to select, as a target spectrum, a mass spectrum corresponding to a peak, from the mass spectrum array stored in the storage section 36. Correction processing may also be performed on the generated or selected spectrum to remove or reduce contaminated components. As a matter of course, the evaluation section 34 evaluates the nature of the target mass spectrum, and in this respect, it is better to use a mass spectrum that is not subjected to correction processing as the target mass spectrum. In FIG. 2, the target mass spectrum is indicated by reference numeral 44. To display the target mass spectrum, data representing the mass spectrum are transmitted from the target mass spectrum generation section 42 to the display processing section 52.

A storage section 48 stores the library. The library contains a plurality of standard mass spectra (group of standard mass spectra) corresponding to the plurality of compounds.

A search section 46 compares the target mass spectrum with each standard mass spectrum constituting a group of standard mass spectra one by one and creates a list of candidate compounds based on the comparison results. At this time, the degree of similarity is computed between the target mass spectrum and each standard mass spectrum. The candidate compounds are then narrowed according to a plurality of degrees of similarity computed for the plurality of standard mass spectra. It is also possible to give any mass spectrum 50 to the search section to perform a library search. Data representing the list of candidate compounds are transmitted from the search section 46 to the display processing section 52.

More specifically, the search section 46 has a function of computing the degree of forward similarity (degree of F similarity) as the first degree of similarity, a function of computing the degree of reverse similarity (degree of R similarity) as the second degree of similarity, and a function of computing the degree of similarity based on the degree of forward similarity and the degree of reverse similarity (total degree of similarity). Generally, the candidate compounds are narrowed down based on the total degree of similarity. In the embodiment, at the time of composite state judgment, the candidate compounds are narrowed down based on the degree of reverse similarity.

The evaluation section 34 judges whether or not the target mass spectrum is in the composite state. In other words, when the target mass spectrum is equivalent to a composite of a plurality of mass spectra derived from a plurality of compounds, the evaluation section 34 judges that the target mass spectrum is in the composite state (this state can also be referred to as the coelution state). In the embodiment, the evaluation section 34 has a function of subtracting the degree of forward similarity from the degree of reverse similarity, thereby obtaining a difference between the degrees of similarity. The evaluation section 34 identifies, from the list of candidate compounds, a group of candidate compounds having the degree of reverse similarity greater than or equal to a threshold s1, and then judges that the target mass spectrum is in the composite state when all candidates in the group of candidate compounds have differences between the degrees of similarity that are greater than or equal to a threshold s2. When the judgment that the target mass spectrum is in the composite state is obtained, data indicating the judgment results are transmitted to a condition change section 51 and the display processing section 52. In addition, in the embodiment, data indicating the difference between the degrees of similarity are also transmitted to the display processing section 52.

The condition change section 51 has a function of changing the time width that forms the condition for peak search. For example, when, in the entire TICC, the number of times the target mass spectra are judged to be in the composite state is greater than or equal to a certain value (for example, 10 times) or a certain ratio (for example, 10 percent), the condition change section 51 makes the time width smaller by one level. For example, it halves the time width. It is also possible to change the time width only for the part for which the judgment of the composite state is obtained, rather than applying a uniform time width along the entire retention time axis.

When the time width is changed, the peak search section 40 searches the TICC for peaks according to the new time width. A plurality of new target mass spectra are thus generated, and these individual target mass spectra are evaluated through the above processes. These processes are repeated until the end condition is satisfied. For example, when the number of times the target mass spectra are judged to be in the composite state becomes smaller than a certain value or a certain ratio, the repeated peak search ends.

The display processing section 52 generates an image to be displayed on the display unit. The image includes the TICC, the list of candidate compounds, the target mass spectra, and the like. At the time of displaying the TICC, an identification processing section 54 displays, along the retention time axis, a display element indicating a timing or a segment in which the judgment of the composite state has been obtained. This makes it possible to observe the TICC while considering the composite state. The list of candidate compounds to be displayed includes not only the total degree of similarity and the degree of reverse similarity but also the difference between the degrees of similarity.

Figure 3:
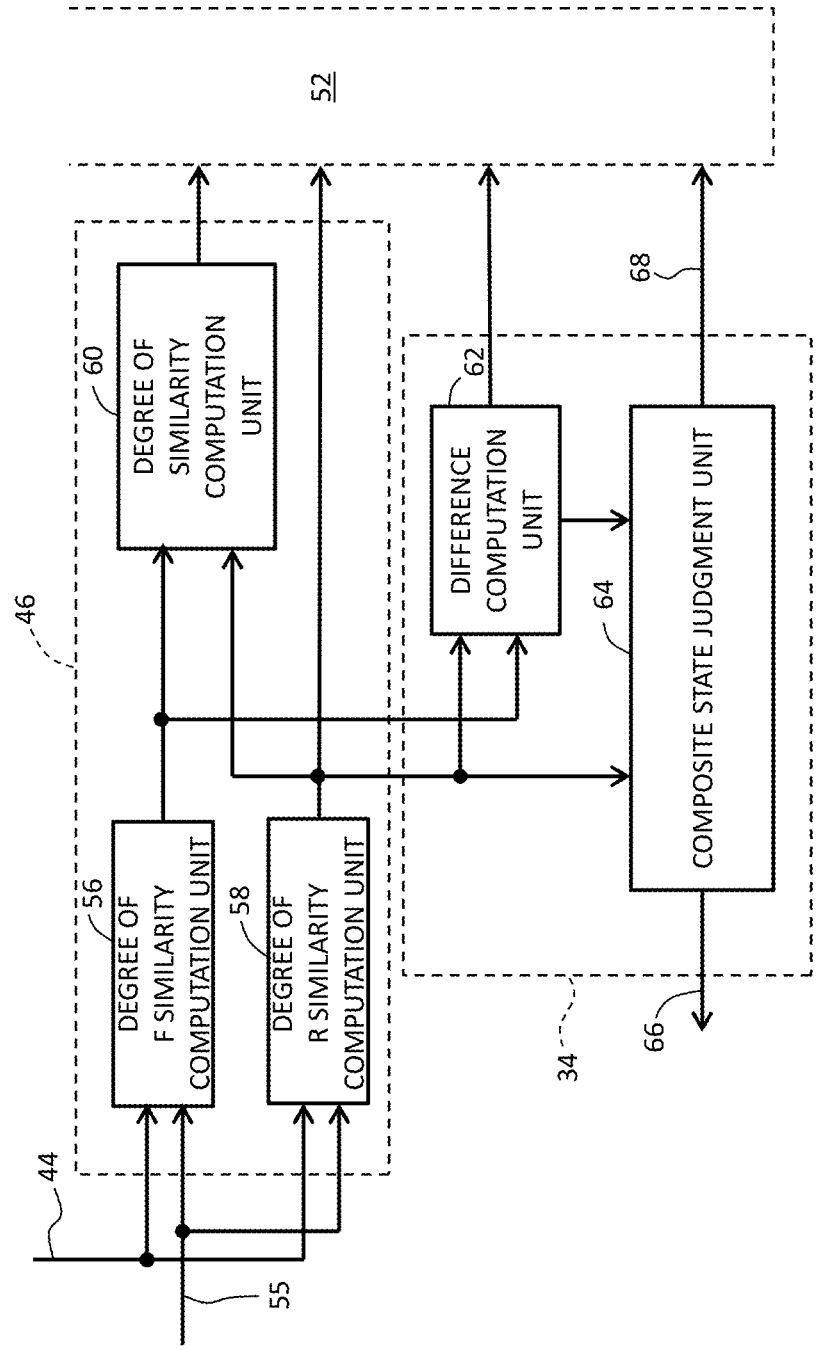
FIG. 3 is a block diagram illustrating example configurations of a search section and an evaluation section.

FIG. 3 illustrates example configurations of the search section 46 (as a searcher) and the evaluation section 34 (as an evaluator). The search section 46 has a degree of F similarity (degree of forward similarity) computation unit 56, a degree of R similarity (degree of reverse similarity) computation unit 58, and a degree of similarity (total degree of similarity) computation unit 60. The evaluation section 34 has a difference computation unit 62 and a composite state judgment unit 64. The degree of F similarity computation unit 56 is a first calculator or a first computation unit, and the degree of R similarity computation unit 58 is a second calculator or a second computation unit. The difference computation unit 62 is a third calculator or a third computation unit.

The degree of F similarity computation unit 56 computes the degree of forward similarity between the target mass spectrum 44 and each standard mass spectrum 55. Specifically, the degree of F similarity computation unit 56 computes, as the degree of forward similarity, the degree of weighed cosine similarity between a first representative value array that represents the target mass spectrum and a first corresponding value array that is selected from the standard mass spectrum according to a corresponding relationship with the first representative value array. The first representative value array is composed of a plurality of numerical values that are greater than or equal to a threshold p1 among all numerical values constituting the target mass spectrum. So long as background noise is already removed from the target spectrum, the threshold p1 may be set to the smallest value greater than 0. Individual numerical values indicate the degrees of intensity. The degree of forward similarity has the property of being lower as the likelihood that the target mass spectrum is a composite mass spectrum derived from a plurality of compounds is higher.

The degree of R similarity computation unit 58 computes the degree of reverse similarity between the target mass spectrum 44 and each standard mass spectrum 55. Specifically, the degree of R similarity computation unit 58 computes, as the degree of reverse similarity, the degree of weighed cosine similarity between a second representative value array that represents the standard mass spectrum and a second corresponding value array that is selected from the target mass spectrum according to a corresponding relationship with the second representative value array. The second representative value array is composed of a plurality of numerical values that are greater than or equal to a threshold p2 among all numerical values constituting the standard mass spectrum. Generally, the smallest value greater than 0 is set as the second threshold. The degree of reverse similarity has the characteristic of being higher as the likelihood that the target mass spectrum includes the standard mass spectrum is higher.

In addition, a plurality of m/z of a plurality of representative values constituting the first representative value array and a plurality of m/z of a plurality of corresponding values constituting the first corresponding value array are identical to each other. There is thus a corresponding relationship between the first representative value array and the first corresponding value array.

The following Equation (1) is an equation to obtain the degree of weighted cosine similarity S.

$$S = 1000 \frac{\left(\sum m_i \cdot \sqrt{A_i \cdot B_i}\right)^2}{\sum (m_i \cdot A_i) \cdot \sum (m_i \cdot B_i)} \quad (1)$$

When the degree of forward similarity is calculated, Ai in the above Equation (1) is an i-th representative value in the target mass spectrum, and Bi in the above Equation (1) is the i-th corresponding value in the standard mass spectrum. When the degree of reverse similarity is calculated, Bi in the above Equation (1) is the i-th representative value in the standard mass spectrum, and Ai in the above Equation (1) is the i-th corresponding value in the target mass spectrum. In the equation, mi indicates the mass (to be exact, the mass-to-charge ratio (mi/z, where Z=1 is assumed)), which is used as a weight.

The degree of similarity computation unit 60 computes the degree of similarity (total degree of similarity) by performing weighted addition on the degree of forward similarity and the degree of reverse similarity. At this time, for example, the following Equation (2) is used. In the following, S indicates the total degree of similarity.

$$S = \frac{S_{A \to B} + S_{B \to A}}{2} \quad (2)$$

In the above Equation (2), the first term (left side) in the numerator indicates the degree of forward similarity, and the second term (right side) in the numerator indicates the degree of reverse similarity. Although, in the above Equation (2), the simple average is computed, this is merely an example, and, for example, a weight of 0.3 may be given to the degree of forward similarity, and a weight of 0.7 may be given to the degree of reverse similarity. At the time of judging the composite state, the list of candidate compounds is composed of a plurality of candidate compounds that have the degree of reverse similarity greater than or equal to the threshold s1, and the candidate compounds are arranged in the order of degree of reverse similarity.

FIG. 3 illustrates a configuration of the evaluation section 34 according to a first example. The difference computation unit 62 subtracts the degree of forward similarity from the degree of reverse similarity, thereby obtaining the difference between the degrees of similarity. When the degree of reverse similarity is relatively high; that is, when the target mass spectrum is highly likely to include the standard mass spectrum, and when the target mass spectrum includes other mass spectra, the degree of forward similarity is low, and the difference between the degrees of similarity is large. Conversely, when the target mass spectrum is highly likely to include the standard mass spectrum, and when the target mass spectrum does not include any other mass spectra, the degree of forward similarity is high, and the difference between the degrees of similarity is small.

When all candidate compounds in the group of candidate compounds having the degree of reverse similarity greater than or equal to the threshold s1 have differences between the degrees of similarity that are greater than or equal to the threshold s2, the composite state judgment unit 64 judges that the target mass spectrum is in the composite state. Conversely, when the group of candidate compounds having the degree of reverse similarity greater than or equal to the threshold s1 include any candidate compound having the difference between the degrees of similarity smaller than the threshold s2, the composite state judgment unit 64 does not judge that the target mass spectrum is in the composite state, but judges that the target mass spectrum is in a non-composite state. This is because that candidate compound can be regarded as a single compound that generates the target mass spectrum.

After the judgment of the composite state is obtained, a signal 66 indicating the judgment results is transmitted to the condition change section and a similar signal 68 is transmitted to the display processing section 52. When the end condition is satisfied, the search results obtained at that time are adopted as the final search results. The highest values of the degree of reverse similarity and the degree of forward similarity are 1000, for example. For example, the threshold s1 is 800, and the threshold s2 is 100.

Figure 4:
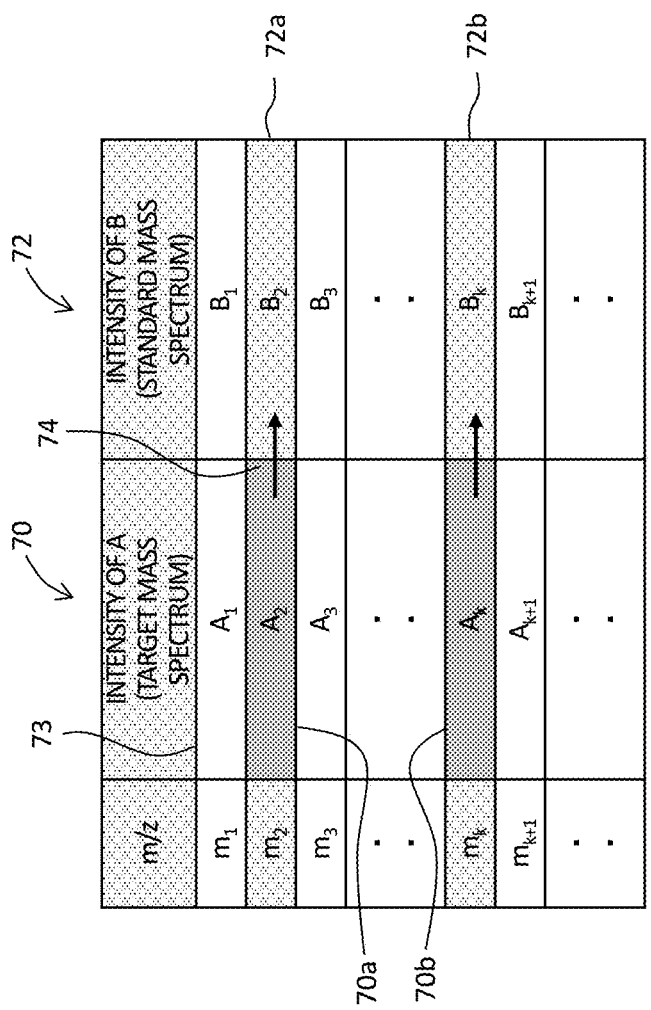
FIG. 4 is a diagram for explaining a forward search.

FIG. 4 illustrates a forward search to obtain the degree of forward similarity. Reference numeral 70 indicates a target mass spectrum A, and reference numeral 72 indicates a standard mass spectrum B. Alignment between the two mass spectra (including mutual alignment in the m/z axis direction) is completed. Each of cells 73 includes a numerical value indicating intensity. For example, numerical values 70a and 70b greater than the threshold p1 constitute a part of a first representative value array. A first corresponding value array having a corresponding relationship with the first representative value array includes numerical values 72a and 72b respectively corresponding to the numerical values 70a and 70b. A plurality of m/z of a plurality of first representative values constituting the first representative value array and a plurality of m/z of a plurality of first corresponding values constituting the first corresponding value array are identical to each other. An arrow 74 indicates the forward search direction.

Figure 5:
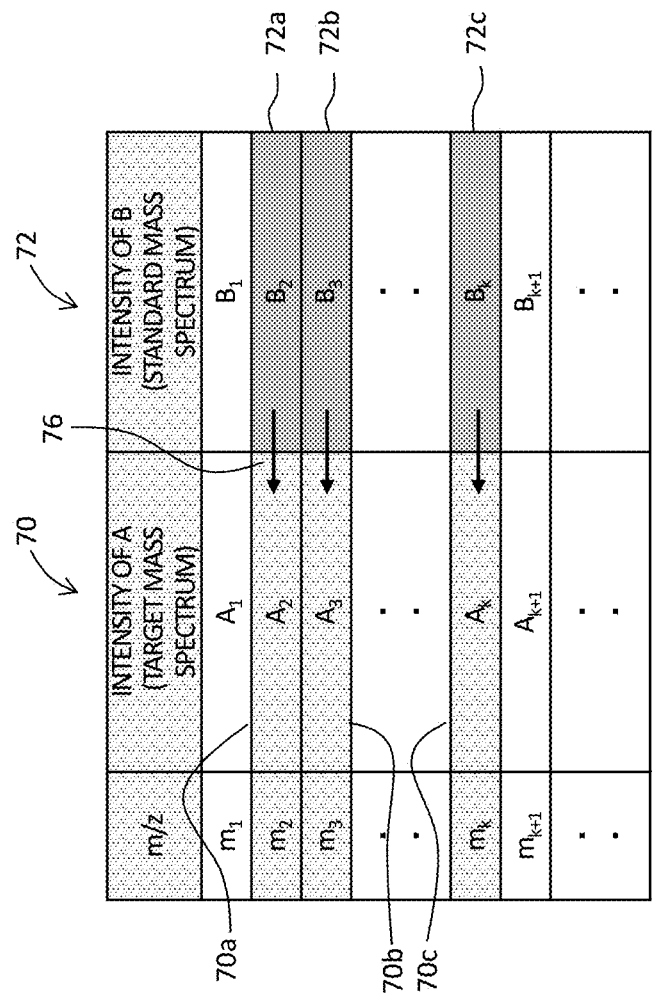
FIG. 5 is a diagram for explaining a reverse search.

FIG. 5 illustrates a reverse search to obtain the degree of reverse similarity. Reference numeral 70 indicates the target mass spectrum A, and reference numeral 72 indicates the standard mass spectrum B. Alignment between the two mass spectra is completed. For example, the numerical values 72a, 72b, and 72c greater than the threshold p2 constitute a part of a second representative value array. A second corresponding value array having a corresponding relationship with the second representative value array includes the numerical values 70a, 70b, and 70c respectively corresponding to the numerical values 72a, 72b, and 72c. A plurality of m/z of a plurality of second representative values constituting the second representative value array and a plurality of m/z of a plurality of second corresponding values constituting the second corresponding value array are identical to each other. An arrow 76 indicates the reverse search direction.

Figure 6:
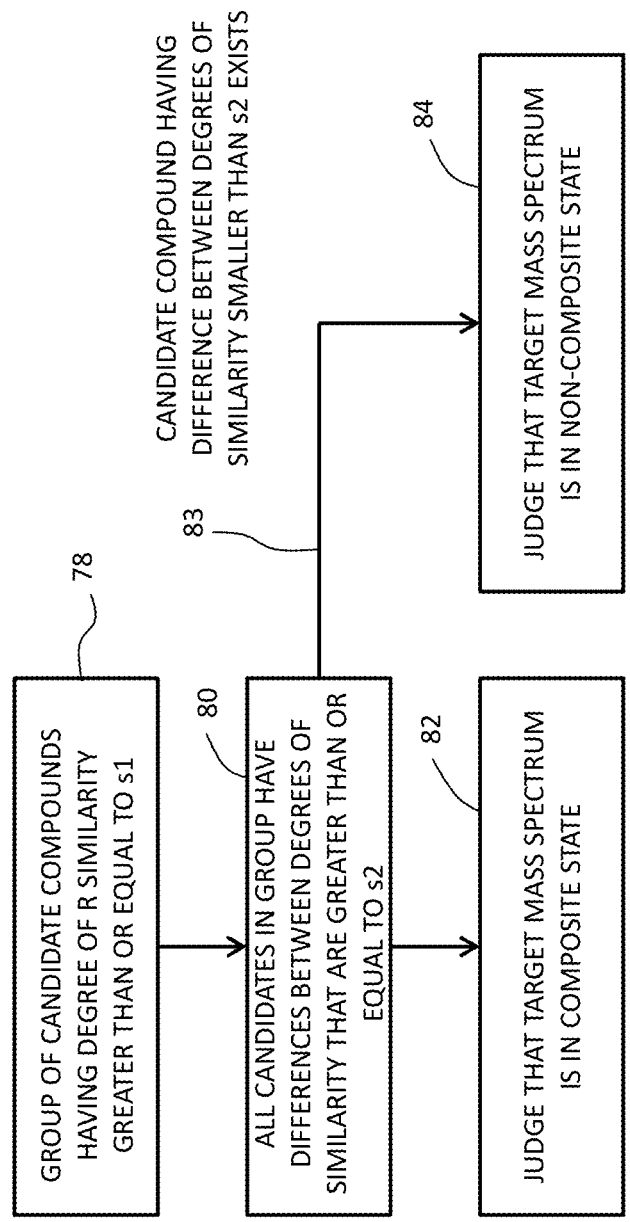
FIG. 6 is a diagram illustrating a judgment method according to a first example.

FIG. 6 illustrates a judgment method according to the first example. First, in the list of candidate compounds, a group of candidate compounds having the degree of reverse similarity greater than or equal to the threshold s1 is identified (see reference numeral 78). Then, whether or not all candidates in the group of candidate compounds have differences between the degrees of similarity that are greater than or equal to the threshold s2 is investigated (see reference numeral 80). When all candidate compounds in the group of candidate compounds have differences between the degrees of similarity that are greater than or equal to the threshold s2, which is, conversely, when none of the group of candidate compounds have a difference between the degrees of similarity that is smaller than the threshold s2, a judgment that the target mass spectrum is in the composite state is obtained (see reference numeral 82). When the group of candidate compounds includes any candidate compound having a difference between the degrees of similarity that is smaller than the threshold s2 (see reference numeral 83), then a judgment that the target mass spectrum is in the non-composite state is obtained (see reference numeral 84), and the list of candidate compounds obtained at that time is provided to the user as the final list of candidate compounds. At this time, a candidate compound having the degree of reverse similarity greater than or equal to the threshold s1 and the difference between the degrees of similarity that is smaller than the threshold s2 may be marked or highlighted. When there is no candidate compound having the degree of reverse similarity greater than or equal to the threshold s1 in the list of candidate compounds, investigation of the difference between the degrees of similarity is not carried out, and that list of candidate compounds is provided to the user.

FIG. 7 illustrates judgment conditions according to the first example. The horizontal axis is an axis indicating the magnitude of the degree of reverse similarity, and the vertical axis is an axis indicating the magnitude of the degree of forward similarity. The two axes define a coordinate space 86. In the coordinate space 86, a combination of the degree of forward similarity and the degree of reverse similarity is indicated by one coordinate point. A line 88 indicates the threshold s1. A line 90 indicates the conditions for differences between the degrees of similarity, and its intercept corresponds to the threshold s2. The height of the intersection of the line 88 and the line 90 is indicated by s1-s2.

In the first example, when, among regions R1 to R4 defined by the lines 88 and 90, all of coordinate points of a group of candidate compounds belong to the region R1, a judgment that the target mass spectrum is in the composite state is obtained. When even one of the coordinate points of the group of candidate compounds belongs to the region R2, a judgment that the target mass spectrum is in the non-composite state is obtained. Thus, the nature of the target mass spectrum; that is, the nature of the extracted component, can be evaluated by using the characteristics of the degree of forward similarity and the degree of reverse similarity.

Examples of the degree of forward similarity, the degree of reverse similarity, and a difference between the degrees of similarity will be described with reference to FIGS. 8 to 12.

Figure 10:
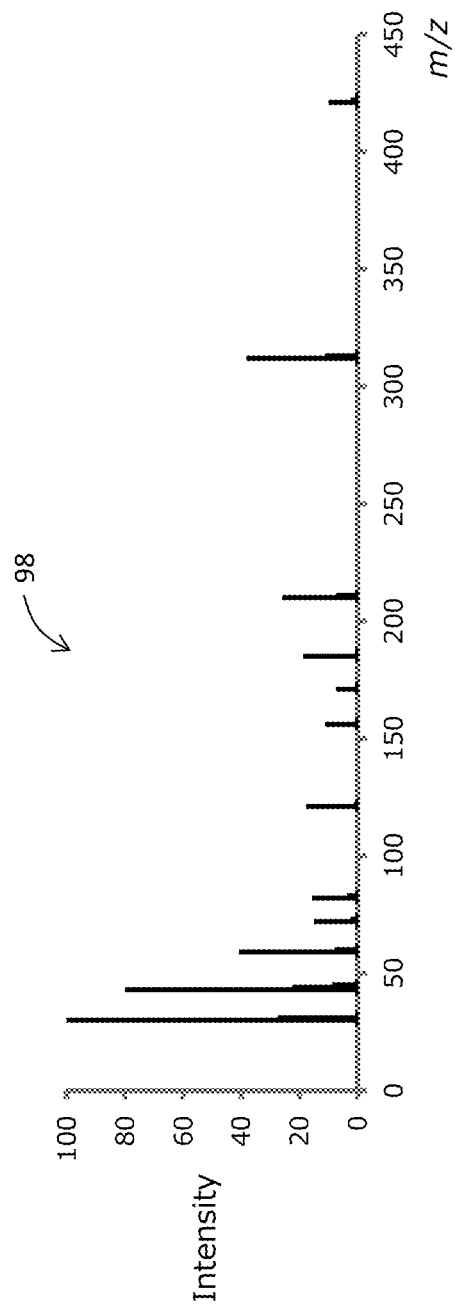
FIG. 10 is a diagram illustrating a composite mass spectrum.

FIG. 8 illustrates a mass spectrum 94 of a compound A. FIG. 9 illustrates a mass spectrum 96 of a compound B that differs from the compound A. FIG. 10 illustrates a composite mass spectrum 98 generated by summing the two mass spectra.

Figure 11:
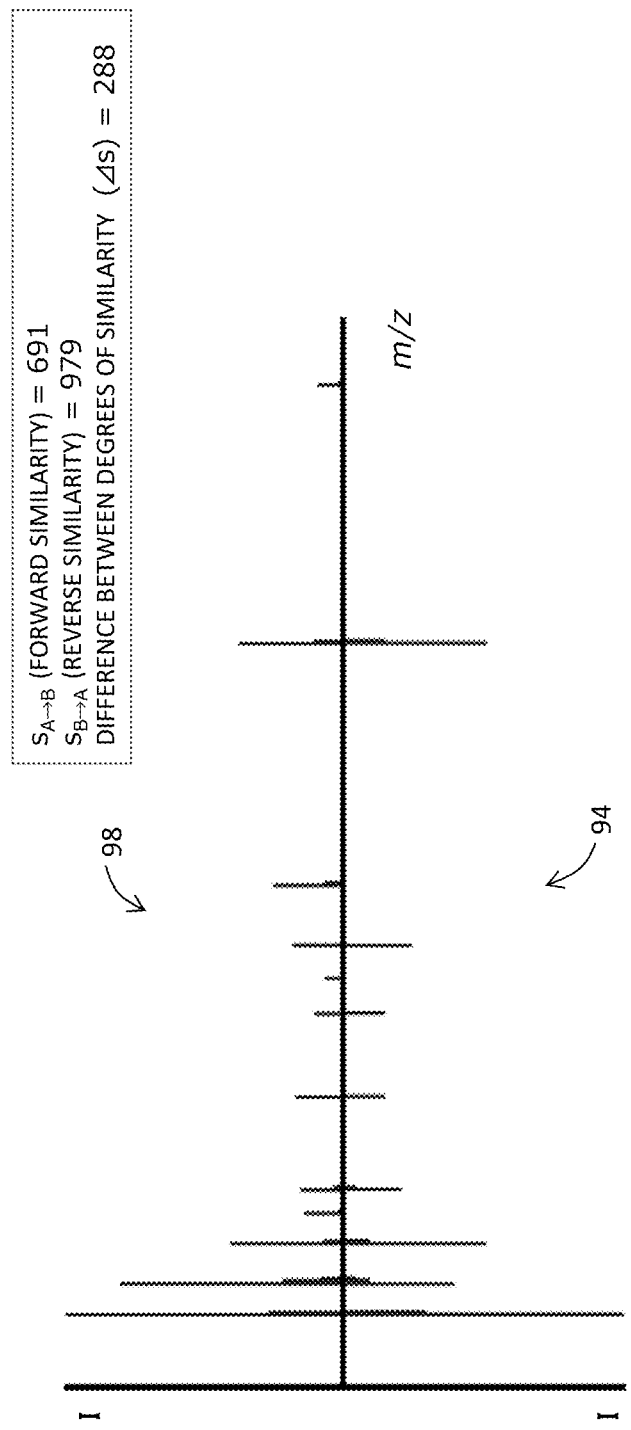
FIG. 11 is a diagram for explaining computation of the degree of similarity between the composite mass spectrum and the mass spectrum of the first compound.

FIG. 11 illustrates the results of calculating the degree of similarity between the composite mass spectrum 98 (upper part) and the mass spectrum 94 of the compound A (lower part). The degree of reverse similarity is greater than the degree of forward similarity. In addition, a large difference between the degrees of similarity is generated.

Figure 12:
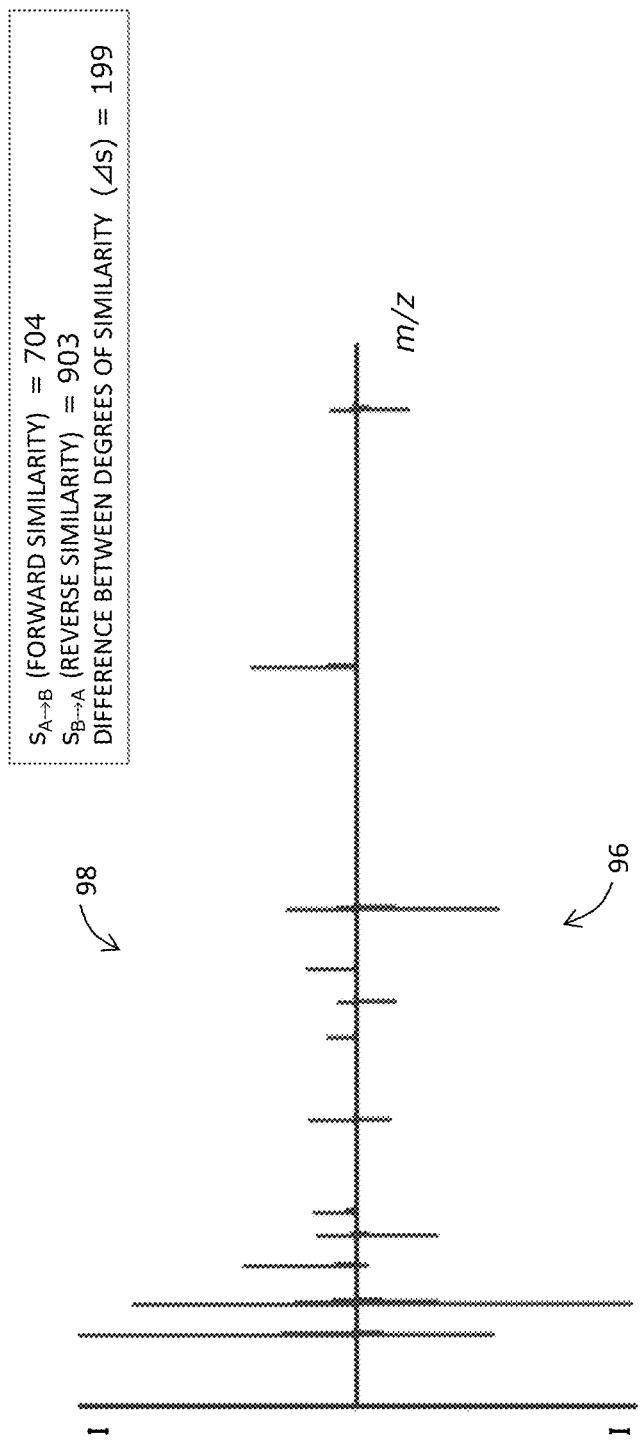
FIG. 12 is a diagram for explaining computation of the degree of similarity between the composite mass spectrum and the mass spectrum of the second compound.

FIG. 12 illustrates the results of calculating the degree of similarity between the composite mass spectrum 98 (upper part) and the mass spectrum 96 of the compound B (lower part). The degree of reverse similarity is greater than the degree of forward similarity. In this case again, a large difference between the degrees of similarity is generated.

As described above, although the degree of reverse similarity is high between the single compound mass spectrum and the composite mass spectrum partly including the single compound mass spectrum, the degree of forward similarity is not very high, resulting in a large difference between the degrees of similarity. Conversely, when mass spectra derived only from the same compound are compared with each other, a difference between the degrees of similarity is very small.

FIG. 13 illustrates a list of candidate compounds 100 according to the embodiment. Each of lines 102 includes a candidate compound identifier 104, a degree of forward similarity 106, a degree of reverse similarity 108, and a difference 110 between the degrees of similarity. In example 1, for example, a group of candidate compounds having the degree of reverse similarity greater than or equal to the threshold s1 (for example, 800) is identified (see reference numeral 112), and judgment is made as to whether or not all candidates in the group of candidate compounds have differences between the degrees of similarity that are greater than or equal to the threshold s2 (for example, 100). Although, in the illustrated example, a difference between the degrees of similarity indicated by reference numeral 114 is smaller than the threshold s2, all candidates in the group of candidate compounds have differences between the degrees of similarity that are greater than or equal to the threshold s2, and therefore, in this case, a judgment that the target mass spectrum is in the composite state is obtained.

The difference between the degrees of similarity may be small when the degree of forward similarity and the degree of reverse similarity are both low. The degree of reverse similarity is therefore added as an object to be evaluated.

FIG. 14 illustrates another list of candidate compounds 116 according to the embodiment. In FIG. 14, the elements that are illustrated in FIG. 13 are assigned the same reference numerals as in FIG. 13, and their description will be omitted. Reference numeral 116 indicates a group of candidate compounds having the degree of reverse similarity greater than or equal to the threshold s1 (for example, 800). A candidate compound having a difference between the degrees of similarity 118 that is smaller than the threshold s2 (for example, 100) is also included among them. This means that the condition that all candidate compounds in the group of candidate compounds have differences between the degrees of similarity that are greater than or equal to the threshold s2 is not satisfied. Therefore, a judgment that the target mass spectrum is in the non-composite state is obtained. The candidate compound having the difference between the degrees of similarity 118 is highly likely to be a compound that generates the target mass spectrum.

Figure 15:
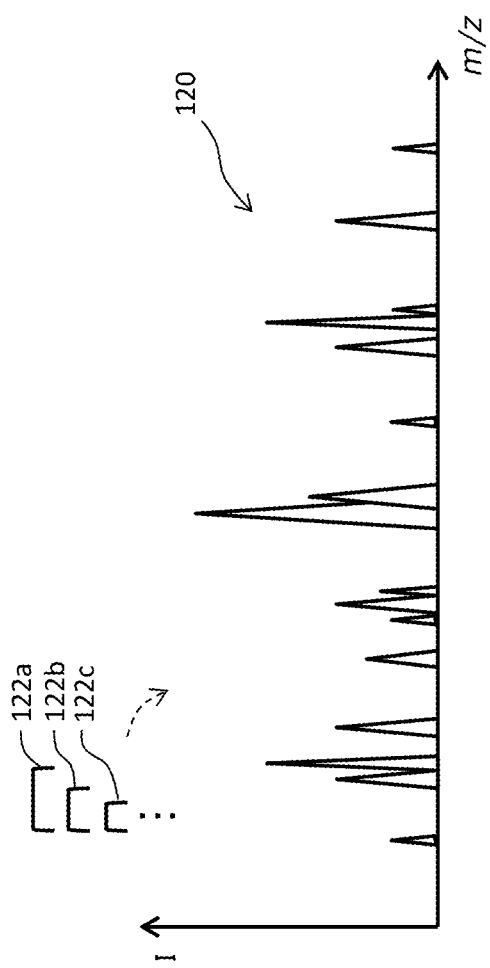
FIG. 15 is a diagram for explaining changing a time width.

FIG. 15 schematically illustrates the effects of the condition change section. The condition change section first sets an initial value for the time width (see reference numeral 122a) for a TICC 120. When, for a plurality of target mass spectra generated based on peak detection according to that time width, the number of times the target mass spectra are judged to be in the composite state is greater than or equal to a certain value, the condition change section changes the time width (see reference numeral 122b). When, for a plurality of target mass spectra generated based on peak detection according to the changed time width, the number of times the target mass spectra are judged to be in the composite state is again greater than or equal to a certain value, the condition change section changes the time width again (see reference numeral 122c). By repeating this process, an optimal time width for the TICC 120 is determined automatically. The same technique may be used to change other parameters, such as, for example, a threshold to be compared with the height of a peak.

Figure 16:
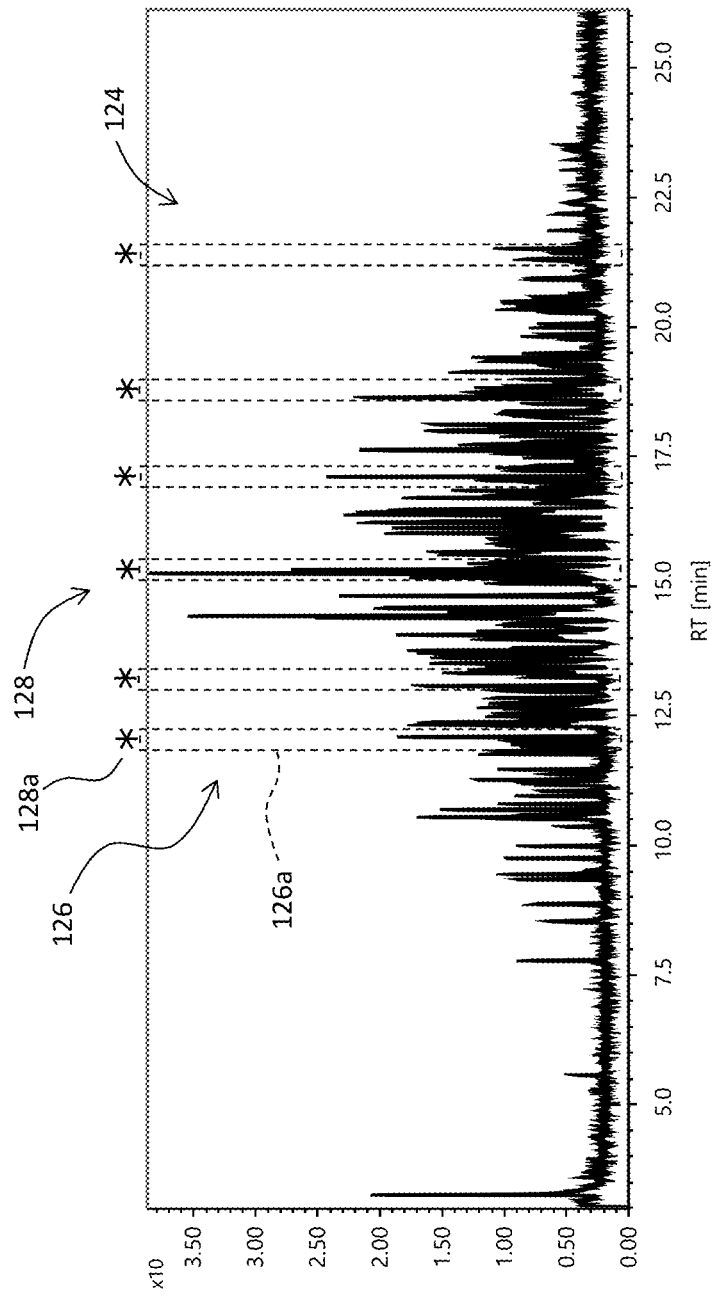
FIG. 16 is a diagram for explaining display of composite judgment results.

FIG. 16 illustrates a chromatogram (TICC) 124 displayed on the display unit. An array of markers 128 is composed of a plurality of markers 128a. Each marker 128a indicates, along the retention time axis, a timing at which a judgment that the target mass spectrum is in the composite state is obtained. An array of frames 126 is composed of a plurality of frames 126a. Each frame 126a surrounds, along the retention time axis, a peak where the judgment that the target mass spectrum is in the composite state is obtained. Referring to the array of markers 128 and the array of frames 126 makes it possible to evaluate whether or not each peak in the chromatogram is a reliable peak (peak derived from a single compound). The displayed TICC may be a TICC that is generated first, or a TICC obtained when the end condition is satisfied. A new TICC may also be displayed every time the time width is updated.

Figure 17:
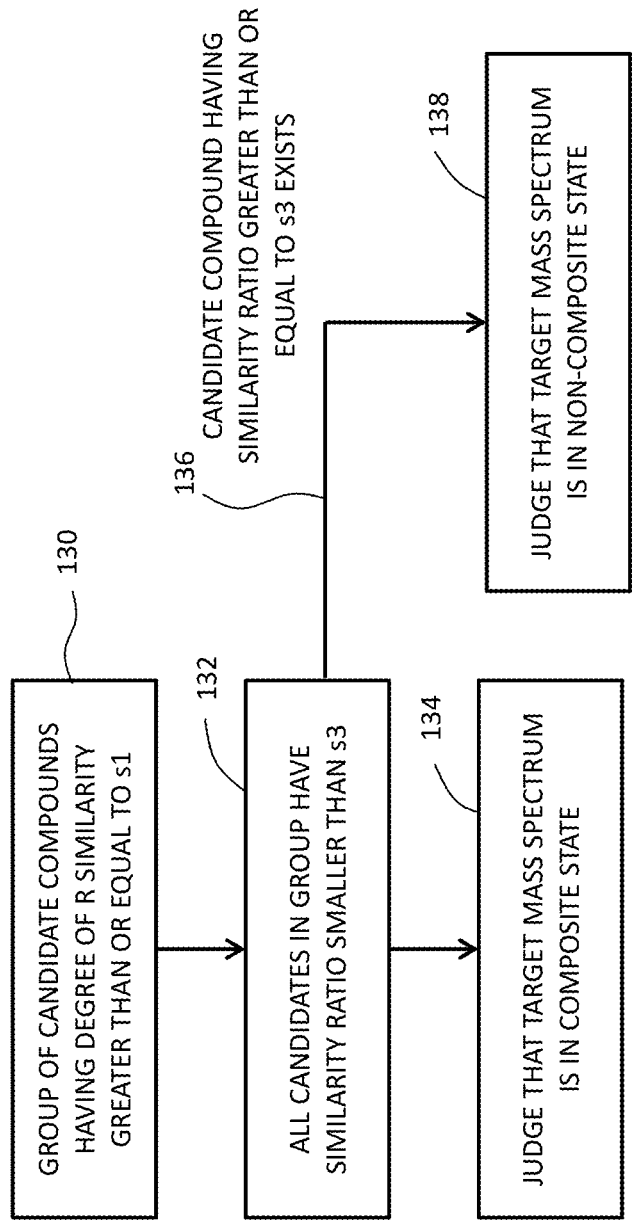
FIG. 17 is a diagram illustrating a method of judging a composite state according to a second example.

FIG. 17 illustrates a judgment method according to the second example. First, in the list of candidate compounds, a group of candidate compounds having the degree of reverse similarity greater than or equal to the threshold s1 is identified (see reference numeral 130). Then, judgment is made as to whether or not all candidates in the group of candidate compounds have the similarity ratio smaller than a threshold S3 (see a reference numeral 132). The similarity ratio is defined by the degree of forward similarity/the degree of reverse similarity. The similarity ratio has similar characteristics to a difference between the degrees of similarity. Here, it should be noted that the similarity ratio and the difference between the degrees of similarity have a relationship where the magnitudes are reversed. The threshold s3 is 0.8, for example. When all candidates in the group of candidate compounds have the similarity ratio smaller than the threshold s3, a judgment that the target mass spectrum is in the composite state is obtained (see reference numeral 134). When the group of candidate compounds includes a candidate compound having the similarity ratio greater than or equal to the threshold s3 (see reference numeral 136), then a judgment that the target mass spectrum is in the non-composite state is obtained (see reference numeral 138).

Figure 18:
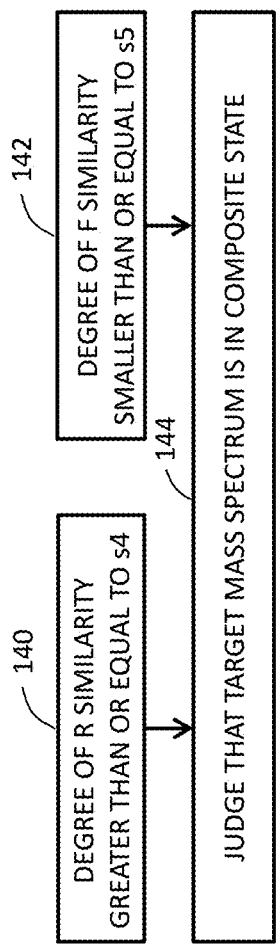
FIG. 18 is a diagram illustrating a method of judging a composite state according to a third example.

FIG. 18 illustrates a judgment method according to the third example. A judgment that the target spectrum is in the composite state is obtained (see reference numeral 144) when, in the list of candidate compounds, all candidate compounds in a group of candidate compounds that are high on the list have the degree of reverse similarity greater than or equal to s4 (see reference numeral 140) and when they have the degree of forward similarity smaller than or equal to s5 (see reference numeral 142). It is also possible to identify a group of candidate compounds by using the degree of reverse similarity as a reference, like in the first example and the second example. It is also possible to designate, as a group of candidate compounds, a predetermined number of candidate compounds from the top in the list of candidate compounds. It is also possible to identify a group of candidate compounds according to other references.

Figure 19:
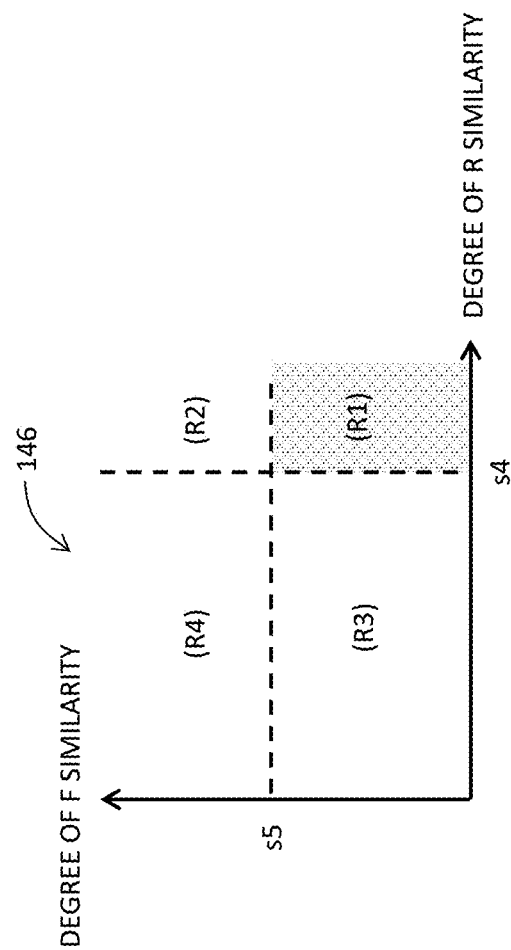
FIG. 19 is a diagram illustrating conditions for judging the composite state according to the third example.

FIG. 19 illustrates judgment conditions according to the third example. The horizontal axis indicates the degree of reverse similarity, and the vertical axis indicates the degree of forward similarity. The two axes define a coordinate space. A vertical line corresponding to a threshold s4 and a horizontal line corresponding to a threshold s5 define regions R1 to R4. In the third example, the target mass spectrum is judged to be in the composite state when all of the coordinates corresponding to a group of candidate compounds belong to the region R1. Since it is not necessary to compute differences between the degrees of similarity, the amount of computation can be reduced accordingly. It is also possible to set a judgment region in any form in the coordinate space and judge whether or not coordinate points belong to that judgment region.

Some variations will now be described. Information other than that related to the degree of similarity may also be taken into consideration secondarily at the time of judging the composite state. Specifically, this is carried out as follows.

A first variation includes the use of two ratios R1 and R2 described below. The ratio R1 is the ratio of a plurality of m/z where numerical values greater than 0 are generated in the target mass spectrum to a plurality of m/z where numerical values greater than 0 are generated in the standard spectrum. The ratio R2 is the ratio of a plurality of m/z where numerical values greater than 0 are generated in the standard mass spectrum to a plurality of m/z where numerical values greater than 0 are generated in the target spectrum. For example, the condition that the ratios R1 and R2 are respectively 0.9 or more and 0.7 or less may be added to the conditions for judging that the target mass spectrum is in the composite state.

A second variation includes the use of two mass spectra obtained by two ionization methods. FIG. 20 illustrates a mass spectrum 150 obtained by an electron ionization method (EI method) and a mass spectrum 152 obtained by a soft ionization method (SI method). The SI method includes a field ionization method (FI method) and a chemical ionization method (CI method). In the mass spectrum 150, a solid line part indicated by reference numeral 154 is a fragment ion peak part derived from a first compound, and a broken line part indicated by reference numeral 156 is a fragment ion peak part derived from a second compound. In contrast, in the mass spectrum 152, a solid line part indicated by reference numeral 158 is a part derived from the first compound and includes a molecular ion peak 162. A broken line part indicated by reference numeral 160 is a part derived from the second compound and includes a molecular ion peak 164. In the mass spectrum 152, for example, the number of molecular ion peaks 162 and 164 may be identified among peaks generated at a certain m/z or greater. In other words, the condition that the number of molecular ion peaks is two or more may be added to the conditions for judging that the target mass spectrum is in the composite state. At the time of identifying the molecular ion peaks 162 and 164, their isotope peaks are removed.

A third variation includes the use of correlation. In FIG. 21, a horizontal axis (x-axis) 168 corresponds to the intensity axis of the target mass spectrum, and a vertical axis (y-axis) 170 corresponds to the intensity axis of the standard mass spectrum. A scatter diagram 166 in FIG. 21 is made by sequentially extracting a pair of numerical values (intensity) for each m/z from the two mass spectra and sequentially mapping a coordinate for each pair in the space defined by the two axes. A line 172 defined by x=y has a certain width 174. The width is defined by y=x±0.2, for example. Although, in the illustrated example, a coordinate 176 is within the width 174, another coordinate 178 is deviated from the width 174. The condition that the number of coordinates deviated from the width 174 is greater than or equal to a predetermined value may be added to the conditions for judging that the target mass spectrum is in the composite state.

A fourth variation is illustrated in FIG. 22. The fourth variation may be implemented when the judgment that the target mass spectrum is in the composite state is obtained in the above embodiment. In S10, for each peak in the TICC, a candidate compound having the best degree of similarity is identified among a group of candidate compounds, and its standard mass spectrum is identified as the best standard mass spectrum. At this time, the best candidate compound is identified by using the degree of reverse similarity as a reference.

In S12, for each peak in the TICC, the condition for fitting the standard mass spectrum (at an initial time, the best standard mass spectrum) to the target mass spectrum is calculated. Specifically, a coefficient α is identified in the following Equation (3) such that a residual d is minimized between a target mass spectrum A composed of a numerical value Ai and a standard mass spectrum B composed of a numerical value Bi. In the equation, mi indicates the mass (to be exact, the mass-to-charge ratio (mi/z, where z=1 is assumed)).

$$d = \Sigma m_i \cdot (A_i - \alpha \cdot B_i)^2 \quad (3)$$

In S14, for each peak in the TICC, the standard mass spectrum multiplied by the coefficient α is subtracted from the target mass spectrum, thereby obtaining a residual mass spectrum. At this time, when a negative value is obtained, it is replaced with 0.

In S16, the residual mass spectrum is evaluated for each peak in the TICC. Specifically, mass spectrum evaluation according to the above embodiment is carried out by using the library. That is, for each peak, judgment is made as to whether or not the mass spectrum is in the composite state.

In S18, judgment is made as to whether or not the end condition is satisfied. For example, a judgment that the end condition is satisfied is obtained when, in the entire TICC, the number of peaks for which the judgment that the mass spectrum is in the composite state has been obtained becomes smaller than or equal to a predetermined value.

When the end condition is not satisfied, the processing after S12 is further applied to the peaks for which the judgment that the mass spectrum is in the composite state has been obtained. Thus, different standard mass spectra are subtracted from the residual mass spectra in a stepwise manner. When the end condition is satisfied for all the peaks, in S20, a list of candidate compounds is output for each peak.

According to the above embodiments, it is possible to judge that a target mass spectrum which has been a target for a library search is a composite mass spectrum. It is also possible to create information that can be referred to in evaluating the nature of the target mass spectrum which has been the target for the library search. It is further possible to allow the user to recognize that peaks included in a chromatogram are peaks derived from a plurality of compounds.

The invention claimed is:

1. A mass spectrum processing apparatus comprising:
a first calculator configured to calculate a first degree of similarity between a first representative value array that represents a target mass spectrum obtained by mass spectrometry of a sample and a first corresponding value array that is selected from a standard mass spectrum in a library according to a corresponding relationship with the first representative value array;
a second calculator configured to calculate a second degree of similarity between a second representative value array that represents the standard mass spectrum and a second corresponding value array that is selected from the target mass spectrum according to a corresponding relationship with the second representative value array;
an evaluator configured to judge, based on the first degree of similarity and the second degree of similarity, that the target mass spectrum is in a composite state in which the target mass spectrum is derived from a plurality of compounds, wherein the first degree of similarity is a degree of forward similarity that has a characteristic of being lower as a likelihood that the target mass spectrum is a composite mass spectrum derived from a plurality of compounds is higher, and wherein the second degree of similarity is a degree of reverse similarity that has a characteristic of being higher as a likelihood that the target mass spectrum includes the standard mass spectrum is higher; and
a search unit configured to perform a library search based on the target mass spectrum and generate a list of candidate compounds,
wherein the evaluator is configured to identify a group of candidate compounds from the list of candidate compounds by narrowing the list of candidate compounds based only on a plurality of second degrees of similarity corresponding to a plurality of candidate compounds constituting the list of candidate compounds,
wherein the evaluator comprises a third calculator configured to calculate, for each candidate compound in the group of candidate compounds, a difference between the first degree of similarity and the second degree of similarity as a difference between the degrees of similarity, and
wherein the evaluator comprises a judgement unit configured to judge that the target mass spectrum is in the composite state based on a plurality of differences between the degrees of similarity corresponding to a plurality of candidate compounds constituting the group of candidate compounds.

2. The mass spectrum processing apparatus according to claim 1, wherein the evaluator judges that the target mass spectrum is in the composite state when a combination of the first degree of similarity and the second degree of similarity belongs to a judgment region located in a space defined by a value of a first degree of similarity axis and a value of a second degree of similarity axis.

3. The mass spectrum processing apparatus according to claim 1, wherein
the third calculator is further configured to calculate the difference between the degrees of similarity by subtracting the first degree of similarity from the second degree of similarity, and
the judgment unit is further configured to judge that the target mass spectrum is in the composite state when, in the list of candidate compounds, all candidates in the group of candidate compounds having the second degree of similarity greater than or equal to a threshold s1 have a difference between the degrees of similarity that is greater than or equal to a threshold s2.

4. The mass spectrum processing apparatus according to claim 1, further comprising
means for generating a chromatogram based on a mass spectrum array obtained by repeating mass spectrometry on a plurality of components temporally separated from the sample,
means for generating or selecting, as the target mass spectrum, a mass spectrum corresponding to a peak included in the chromatogram from the mass spectrum array, and
means for changing conditions for peak detection performed on the chromatogram when a judgment that the target mass spectrum is in the composite state is obtained.

5. The mass spectrum processing apparatus according to claim 4, wherein
the means for changing the conditions reduces a time width that is the condition for the peak detection when the judgment that the target mass spectrum is in the composite state is obtained, and
after the time width is changed, the peak detection is performed again on the chromatogram.

6. The mass spectrum processing apparatus according to claim 1, further comprising
means for generating a chromatogram having a retention time axis based on a mass spectrum array obtained by repeating mass spectrometry on a plurality of components temporally separated from the sample, and
means for displaying a display element indicating a period or a segment in which the judgment that the target mass spectrum is in the composite state is obtained, along with the chromatogram.

7. The mass spectrum processing apparatus according to claim 1, wherein
the first representative value array is composed of a plurality of numerical values that are greater than or equal to a threshold p1 among all numerical values constituting the target mass spectrum, and
the second representative value array is composed of a plurality of numerical values that are greater than or equal to a threshold p2 among all numerical values constituting the standard mass spectrum.

8. A mass spectrum processing method comprising the steps of:
computing a first degree of similarity between a first representative value array that represents a target mass spectrum obtained by mass spectrometry of a sample and a first corresponding value array that is selected from a standard mass spectrum in a library according to a corresponding relationship with the first representative value array;
computing a second degree of similarity between a second representative value array that represents the standard mass spectrum and a second corresponding value array that is selected from the target mass spectrum according to a corresponding relationship with the second representative value array;
judging that the target mass spectrum is a composite mass spectrum derived from a plurality of compounds, or providing information indicating the possibility that the target mass spectrum is the composite mass spectrum, based on the first degree of similarity and the second degree of similarity, wherein the first degree of similarity is a degree of forward similarity that has a characteristic of being lower as a likelihood that the target mass spectrum is a composite mass spectrum derived from a plurality of compounds is higher, and wherein the second degree of similarity is a degree of reverse similarity that has a characteristic of being higher as a likelihood that the target mass spectrum includes the standard mass spectrum is higher;
performing a library search based on the target mass spectrum and generate a list of candidate compounds;
identifying a group of candidate compounds from the list of candidate compounds by narrowing the list of candidate compounds based only on a plurality of second degrees of similarity corresponding to a plurality of candidate compounds constituting the list of candidate compounds,
calculating, for each candidate compound in the group of candidate compounds, a difference between the first degree of similarity and the second degree of similarity as a difference between the degrees of similarity, and
judging that the target mass spectrum is in the composite state based on a plurality of differences between the degrees of similarity corresponding to a plurality of candidate compounds constituting the group of candidate compounds.

9. A non-transitory storage medium storing a program to be executed in an information processing device, the program comprising:
a function of computing a first degree of similarity between a first representative value array that represents a target mass spectrum obtained by mass spectrometry of a sample and a first corresponding value array that is selected from a standard mass spectrum in a library according to a corresponding relationship with the first representative value array;
a function of computing a second degree of similarity between a second representative value array that represents the standard mass spectrum and a second corresponding value array that is selected from the target mass spectrum according to a corresponding relationship with the second representative value array; and
a function of judging that the target mass spectrum is a composite mass spectrum derived from a plurality of compounds, or providing information indicating the possibility that the target mass spectrum is the composite mass spectrum, based on the first degree of similarity and the second degree of similarity, wherein the first degree of similarity is a degree of forward similarity that has a characteristic of being lower as a likelihood that the target mass spectrum is a composite mass spectrum derived from a plurality of compounds is higher, and wherein the second degree of similarity is a degree of reverse similarity that has a characteristic of being higher as a likelihood that the target mass spectrum includes the standard mass spectrum is higher;

a function of performing a library search based on the target mass spectrum and generate a list of candidate compounds;

a function of identifying a group of candidate compounds from the list of candidate compounds by narrowing the list of candidate compounds based only on a plurality of second degrees of similarity corresponding to a plurality of candidate compounds constituting the list of candidate compounds, a function of calculating, for each candidate compound in the group of candidate compounds, a difference between the first degree of similarity and the second degree of similarity as a difference between the degrees of similarity, and a function of judging that the target mass spectrum is in the composite state based on a plurality of differences between the degrees of similarity corresponding to a plurality of candidate compounds constituting the group of candidate compounds.

\* \* \* \* \*